United States Patent [19]

Engel

[11] Patent Number: 5,383,298
[45] Date of Patent: Jan. 24, 1995

[54] FISHING ROD HOLDER WITH HOOK SETTING TRIGGER

[76] Inventor: Steve J. Engel, 14866 El Capitan, Delhi, Calif. 95315

[21] Appl. No.: 176,961

[22] Filed: Jan. 3, 1994

[51] Int. Cl.⁶ .................. A01K 97/12; A01K 91/06
[52] U.S. Cl. ............................................. 43/15
[58] Field of Search ...................... 43/15, 16, 21.2

[56] References Cited

U.S. PATENT DOCUMENTS

| | | | |
|---|---|---|---|
| 3,407,527 | 10/1968 | Hill | 43/15 |
| 3,412,499 | 11/1968 | Pastrovich | 43/15 |
| 3,722,127 | 3/1973 | Atkins | 43/15 |
| 3,914,894 | 10/1975 | Kobza | 43/15 |
| 4,031,651 | 6/1977 | Titze | 43/15 |
| 4,219,955 | 9/1980 | Lo Bosco | 43/15 |
| 4,235,035 | 11/1980 | Guthrie | 43/15 |
| 4,344,248 | 8/1982 | Brophy, Sr. | 43/15 |
| 4,397,113 | 8/1983 | Pinson | 43/15 |
| 4,476,645 | 10/1984 | Paarmann | 43/15 |
| 4,486,968 | 12/1984 | Gould | 43/15 |
| 4,492,053 | 1/1985 | Poulin | 43/15 |
| 4,676,018 | 6/1987 | Kimball | 43/15 |
| 4,677,783 | 7/1987 | Cratsa | 43/15 |
| 4,730,408 | 3/1988 | Miller | 43/15 |
| 4,912,870 | 4/1990 | Smoluk | 43/15 |

*Primary Examiner*—Kurt Rowan
*Attorney, Agent, or Firm*—Flehr, Hohbach, Test, Albritton & Herbert

[57] ABSTRACT

A holder for a fishing rod which automatically sets a hook in fish or other aquatic game. The holder includes a post adapted for mounting in the ground with the post pivotally mounting a beam which is constrained for movement between a waiting position and released position. A cradle mounted on the upper end of the beam supports the butt end of the fishing rod, and the lower end of the beam is connected through a collapsible linkage with the lower end of the post. A trigger is provided for converting the linkage from a set position at which a rigid link interconnects the beam and post and a collapsed position which enables the beam to pivot toward its released position. A tension spring is provided for applying a bias force for urging the beam toward its released position. The trigger responds to a predetermined magnitude of pulling force on the fishing line when the fish or other aquatic game strikes the hook. Movement of the linkage toward its collapsed position moves the rod so that its tip end applies a vigorous pulling force on the line to set the hook in the fish.

12 Claims, 2 Drawing Sheets

FISHING ROD HOLDER WITH HOOK SETTING TRIGGER

BACKGROUND OF THE INVENTION

1. Field of the Invention

This invention relates in general to fishing equipment, and more particularly relates to fishing rod holders which operate to automatically set hooks in fish and other aquatic game.

2. Description of the Prior Art

In the prior art, various types of fishing equipment have been provided for automatically setting fish hooks. The prior devices typically employ mechanical linkages incorporating a trigger mechanism which automatically releases responsive to a tug on the fishing line so as to exert a force on the line for setting the hook in the fish. Among the disadvantages and limitations of these prior trigger mechanisms is that many are relatively complex in design, expensive to produce and are failure prone. Other such designs include hair trigger release mechanisms which can be activated prematurely, or in which the trigger release mechanism is difficult to properly adjust.

SUMMARY OF THE INVENTION

The present invention provides a fishing rod holder which includes a post that is adapted for mounting in the ground or other support. A beam is pivotally mounted on the post, with the upper end of the beam supporting a cradle in which the butt end of the fishing rod is fitted. The lower end of the beam is connected with the lower end of the post through a collapsible linkage. The collapsible linkage comprises a pair of rigid bars which are pivotally mounted together at their inner ends. The collapsible linkage converts between a set position in which the bars are rigidly linked at an over-center location, and a collapsed position which enables the beam to pivot relative to the post toward a released position. The linkage is collapsed responsive to a predetermined magnitude of pulling force on the fishing line which results from the fish or other aquatic game striking the hook. A tension spring mounted between the post and beam applies a force for urging the beam toward the released position when the linkage collapses. As the beam is moved toward its released position, the tip end of the rod moves upward and applies a vigorous pulling force on the fishing line to set the hook in the fish or other aquatic game.

DESCRIPTION OF THE PREFERRED EMBODIMENTS

Figure 1:
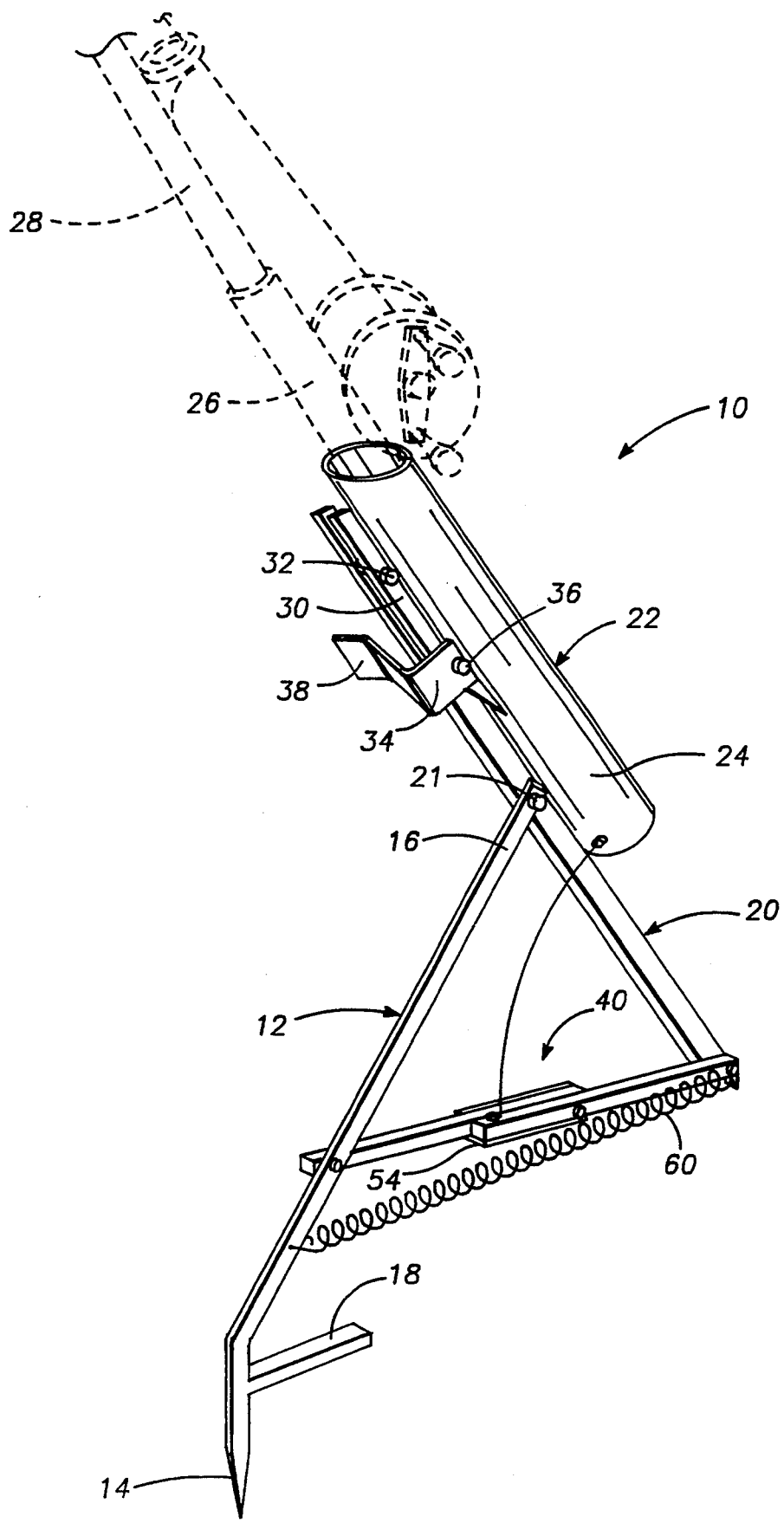
FIG. 1 is a perspective view illustrating a fishing rod holder in accordance with a preferred embodiment of the invention.

In the drawings FIG. 1 illustrates generally at 10 a fishing rod holder in accordance with a preferred embodiment of the invention. Holder 10 is comprised of a post 12 having a vertically downwardly extending pointed end 14 and an upper end 16 which inclines backwardly from the vertical at an angle, which can advantageously be in the range of 30° to 60°. A cross bar 18 is formed below the juncture between the upper and lower ends of the post to limit penetration into the ground. As desired, post 12 could be modified to include a suitable clamping device, not shown, for mounting the holder to a boat or other support structure. The holder further includes a beam 20 which is pivotally mounted at its midspan to the upper end of the post by means of a pin 21.

Figure 2:
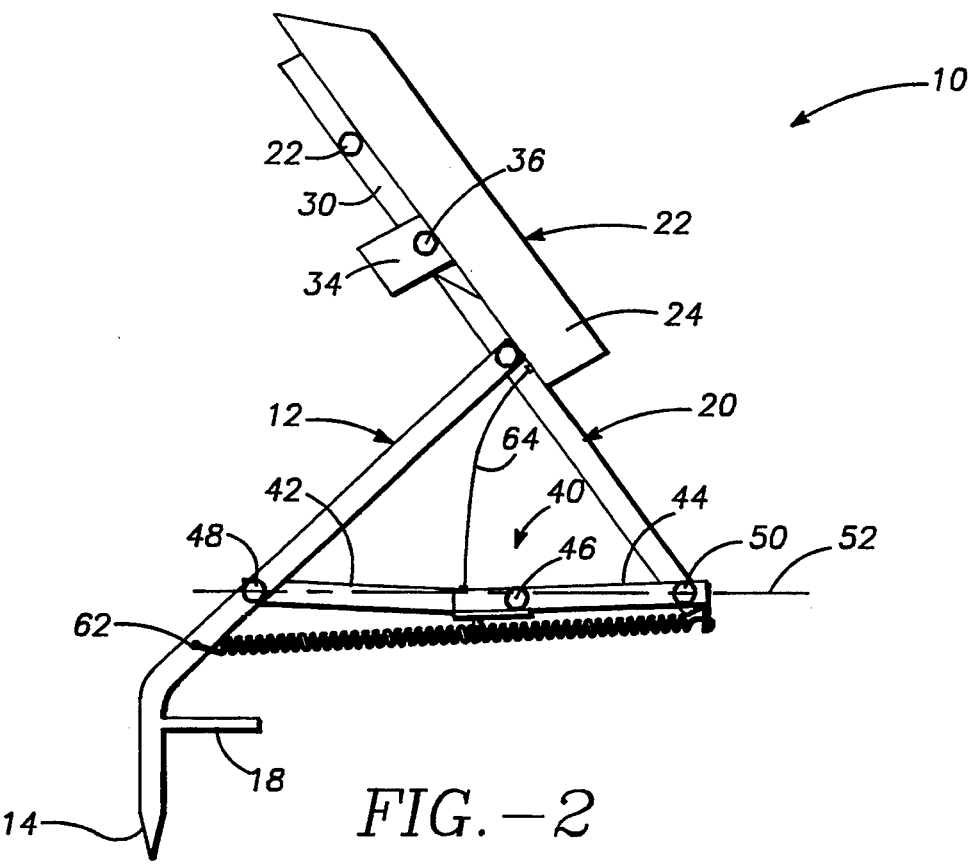
FIG. 2 is a side elevation view, to a reduced scale, of the fishing rod holder of FIG. 1 with the elements shown in the waiting position of the holder.
Figure 3:
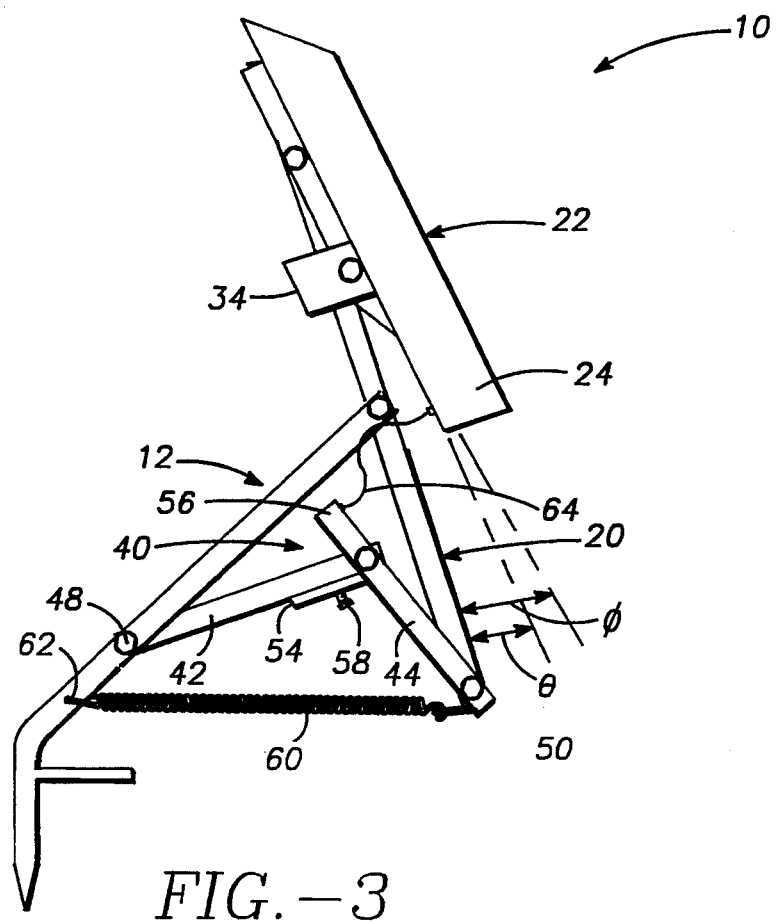
FIG. 3 is a side elevation view similar to FIG. 2 showing the elements in the released position.

A cradle 22 which comprises a tube 24 that is closed at its lower end is provided for releasably receiving the butt end 26 of a fishing rod 28. The cradle includes a bracket 30 secured along the lower end of the tube, and this bracket is pivotally mounted by means of pin 32 to the upper end of beam 20. An L-shaped stop bar 34 is mounted by means of fastener 36 to the lower portion of cradle bracket 30. A transversely extending arm 38 of the stop bar is spaced a predetermined distance below the beam for delimiting the angle through which the cradle, and thereby the fishing rod, pivots relative to the beam. FIG. 2 shows the cocked position of the cradle in which its longitudinal axis is substantially parallel with the beam. FIG. 3 shows the cradle after it is pivoted through a predetermined angle $\theta$ at which the trigger mechanism is released, as explained in more detail below. Further movement of the cradle is restrained when stop bar arm 34 contacts the beam at the given included angle $\Phi$ between the cocked and uncocked positions, and this defines the uncocked position. The travel angle $\theta$ can be in the range of 5° to 20°, and is preferably 10°.

A collapsible linkage mechanism 40 is provided for interconnecting the lower end of the beam with the post. Collapsible linkage mechanism 40 includes a pair of rigid elongate bars 42, 44 which are pivotally mounted together at their inner ends by a pin 46. The outer end of bar 42 is pivotally mounted to a lower portion of the post by pin 48 while the outer end of bar 44 is pivotally mounted to the lower end of the beam by pin 50. The pins which mount the bars enable them to pivot in an upright plane between the "set" position shown in FIG. 2 and the "collapsed" position shown in FIG. 3. In the set position the bars form a rigid link between the beam and post with the bars inclining downwardly together at an over-center position. This over-center position is below a centerline 52 extending between the centers of the pins 48 and 50 at which the outer ends of the bars are mounted on the respective beam and post.

The orientation at which the bars are in their over-center positions is established by stop means which comprises an angle iron 54 which is secured to the inner end of bar 42. The angle iron is positioned in the path of movement of an end portion 56 of the opposite bar 44 which extends beyond pivot pin 46. Selection means is provided for selectively varying the distance below the centerline at which downward pivotal movement of the bars is stopped. The selection means comprises a set screw 58 which is mounted through a threaded opening formed in the angle iron. The and the upper end of the set screw contacts end portion 56 of bar 44 when the collapsible linkage is in its set position. When the bars are aligned at their over-center position, set screw 58 can be manually turned in and out to selectively adjust the over-center position. As the set screw is backed out, the distance between pivot pin 46 and centerline 52 is increased to correspondingly lower the over-center position. As the set screw is turned in, the distance between the pin and centerline is decreased to correspondingly raise the over-center position.

This feature permits the sensitivity of the collapsible linkage to be selectively adjusted. Suitable locking means, such as a jam nut or spring pressure plate, not shown, can be provided to lock the set screw for maintaining the desired sensitivity adjustment.

Force biasing means is provided for applying a bias force tending to pivot beam 20 in a clockwise direction, as viewed in FIG. 2. The force biasing means comprises a tension spring 60 mounted at one end to the lower end of the beam and at its other end to an opening 62 on post 12 which is spaced below connecting pin 48. The distance at which opening 62 is spaced below pin 48 is established so that when collapsible linkage 40 is in its set position, the pulling force from the spring creates compression forces in the bars 42 and 44. These compression forces have downward force components which tend to lightly hold the bars in their over-center positions. The downward force components are overcome by the magnitude of an upward force that is applied to the collapsible linkage by a flexible cable 64. This cable is connected at its lower end to bar end portion 56 and at its upper end to the lower end of the rod holder tube 24. The length of cable 64 is predetermined so that it becomes taut when the cradle pivots through the angle θ for triggering release of the collapsible linkage. When the fishing rod tip (not shown) is bent downwardly from a pulling force on the fishing line, such as when a fish strikes the hook, the rod and therefore cradle 22 are pivoted counterclockwise, as viewed in FIG. 2. This pivotal action pulls cable 64 up to apply the upward force on the collapsible linkage. The action provides a trigger for converting the collapsible linkage from the set position to the collapsed position.

In the use and operation of the invention, holder 10 is first set upright at the desired fishing location by pushing spike end 14 into the ground. With a hook, bait and sinker attached to the fishing line, the angler casts the bait into the water and then sets butt end 26 of the rod into cradle 22. The cradle is then pivoted to the cocked position shown in FIG. 2, which moves beam apart from post while bars 42 and 44 are pivoted downwardly to the over-center position. This also stretches spring 60, which applies the bias force that tends to lightly hold the bars in their over-center position. In this configuration cable 64 has some slack. This establishes the waiting position of the fishing rod holder.

When a fish strikes the hook, the fishing line pulls against the tip of the rod. The rod bends down and pivots cradle 22 counterclockwise towards the uncocked position which is defined by the point at which stop bar arm 38 contacts the lower edge of beam 20. Prior to reaching the uncocked position, the cradle travels through the angle θ, at which point cable 64 becomes taut and begins applying an upward pulling force against rod end portion 56. This pulling force converts collapsible linkage 40 from the set position to the collapsed position shown in FIG. 3. The cradle and fishing rod build up angular momentum as they move toward the uncocked position. As the cable becomes taut, a portion of the combined momentum of the cradle and fishing rod is converted into a sharp upward pulling force sufficient to overcome the downward force components from the spring acting on bars 42 and 44. This moves the bars back through their over-center position and ensures that the linkage is converted to its collapsed position. As desired, a bell, not shown, could be clipped to the cradle or beam to provide the angler with an audible alert that there is a strike on the line.

The continued force of spring 60 pivots the bars upwardly past the over-center position, and at the same time the spring pivots beam 20 so that its upper end carries cradle 22 clockwise as viewed in FIG. 3. This moves the tip end of the rod sharply upwardly to apply a vigorous pulling force on the line and set the hook in the fish or other aquatic game. After the fish is hooked, spring 60 acts to keep the fishing line taut. At this point the fish is essentially fighting against the force of the spring. The angler can then pull the rod out of the holder to land the fish.

While the foregoing embodiment is at present considered to be preferred it is understood that numerous variations and modifications may be made therein by those skilled in the art and it is intended to cover in the appended claims all such variations and modifications as fall within the true spirit and scope of the invention.

What is claimed is:

1. A holder for a fishing rod to automatically set a hook in fish or other aquatic game and in which the hook is attached to the end of a fishing line, the fishing rod having a butt end together with a tip end which supports the fishing line, the holder comprising the combination of a post adapted for mounting on a ground location or other support, a beam mounted on the post for pivotal movement about a horizontal axis with the beam having upper and lower ends which are positioned on opposite sides of the horizontal axis, means for constraining the beam to pivot about said axis between a waiting position and a released position, with said upper end, when the beam is in its waiting position, extending in an upward direction while the lower end extends downwardly at a predetermined included angle with respect to the post, support means for releasably supporting the butt end of the fishing rod on said upper end of the beam, collapsible linkage means convertible between a set position for forming a rigid link which connects the lower end of the beam with the post and a collapsed position for enabling the beam to pivot about the horizontal axis and move toward said released position, trigger means for moving the linkage means from the set position responsive to a pulling force on the fishing line which results from the fish or other aquatic game striking the hook, and force biasing means for applying a bias force on the beam for moving the linkage means to the collapsed position and for urging said upper end of the beam in a direction toward the released position, when the collapsible linkage means is moved from its set position, and for moving the tip end of the rod in a direction which applies a vigorous pulling force on the fishing line to set the hook in the fish or other aquatic game.

2. A fishing rod holder as in claim 1 in which said collapsible linkage means comprises first and second rigid elongate bars with each bar having an inner end and an outer end, means for mounting the bars together at their inner ends for pivotal movement in an upright plane and with the bars being linked together in a rigid orientation when the linkage means is at the set position, and means for pivotally mounting the outer end of the first bar at one point on the post and also for pivotally mounting the outer end of the second bar at another point on the lower end of the beam.

3. A fishing rod holder as in claim 2 which includes stop means for causing downward pivotal movement of the bars to stop, when the linkage means is in its set position, at an over-center position which is below a centerline which extends between said points at which the outer ends of the first and second bars are mounted on the respective beam and post.

4. A fishing rod holder as in claim 3 in which said force biasing means applies the bias force along another axis which inclines at a predetermined angle with respect to said centerline sufficient to cause the bias force to releasably hold the bars in said rigid orientation at the over-center position, and with the bias force being insufficient to hold the bars at the over-center position responsive to said pulling force on the fishing line for enabling the trigger means to convert the linkage means to the collapsed position.

5. A fishing rod holder as in claim 3 in which includes said trigger means move the linkage means to the collapsed position responsive to a selected magnitude of said pulling force.

6. A fishing rod holder as in claim 5 which includes selection means for selectively varying the distance below the centerline at which said downward pivotal movement of the bars is stopped.

7. A fishing rod holder as in claim 2 in which said trigger means further includes means responsive to said pulling force for applying an upward force on the linkage means sufficient to pivot the bars upwardly from said rigid orientation to enable said force biasing means to apply said bias force on the beam.

8. A fishing rod holder as in claim 1 in which said support means includes a cradle for carrying said butt end of the rod, said trigger means includes means for mounting the cradle on the upper end of the beam for pivotal movement between a cocked position and an uncocked position, said cradle in its cocked position carrying the butt end so that the rod is held for fishing and with said pulling force on the line causing the cradle to move with combined momentum toward the uncocked position, said trigger means further including momentum conversion means responsive to movement of the cradle toward said uncocked position for converting a portion of said combined momentum of the cradle and fishing rod into said upward force applied on the linkage means.

9. A fishing rod holder as in claim 8 in which said momentum conversion means includes means for converting said combined momentum into the upward force responsive to pivotal movement of the cradle through a predetermined angle from the cocked position which predetermined angle is less than said given included angle between said cocked and uncocked positions.

10. A fishing rod holder as in claim 9 in which said momentum conversion means comprises an elongate flexible member having one end attached to a lower end of the cradle and having another end attached to either of the first or second bars at a position between said outer ends of the bars.

11. A fishing rod holder as in claim 9 in which said predetermined angle is in the range of substantially 5 to 15 degrees.

12. A fishing rod holder as in claim 1 in which said force biasing means includes spring means for applying a yieldable pulling force between the lower end of the beam and the post.

* * * * *